United States Patent [19]
Zheng et al.

[11] Patent Number: 5,610,995
[45] Date of Patent: Mar. 11, 1997

[54] METHOD AND APPARATUS FOR COMPRESSING IMAGES CONTAINING OPTICAL SYMBOLS

[75] Inventors: Joe Zheng, Brookfield, Conn.; Wenhua Li, Mt. Prospect, Ill.

[73] Assignee: United Parcel Service of America, Inc., Atlanta, Ga.

[21] Appl. No.: 467,093

[22] Filed: Jun. 6, 1995

[51] Int. Cl.$^6$ .................................................. G06K 9/18
[52] U.S. Cl. .......................... 382/183; 235/462; 382/243
[58] Field of Search ................................. 382/101, 102, 382/103, 183, 243, 318; 235/462, 463; 358/450, 453

[56] References Cited

U.S. PATENT DOCUMENTS

| | | | |
|---|---|---|---|
| Re. 33,316 | 8/1990 | Katsuta et al. | 364/521 |
| 3,846,753 | 11/1974 | Spanjersberg | 382/101 |
| 4,020,462 | 4/1977 | Morrin, II | 382/233 |
| 4,034,341 | 7/1977 | Isono et al. | 382/101 |
| 4,454,610 | 6/1984 | Sziklai | 382/119 |
| 4,481,665 | 11/1984 | Ota | 382/102 |
| 4,524,453 | 6/1985 | Egami et al. | 382/101 |
| 4,542,378 | 9/1985 | Suganuma et al. | 345/113 |
| 4,542,528 | 9/1985 | Sanner et al. | 382/318 |
| 4,741,047 | 4/1988 | Sharpe, II | 382/101 |
| 4,829,453 | 5/1989 | Katsuta et al. | 382/305 |
| 5,040,233 | 8/1991 | Davy et al. | 382/239 |
| 5,054,088 | 10/1991 | Gunderson et al. | 382/120 |
| 5,058,186 | 10/1991 | Miyaoka et al. | 382/154 |
| 5,073,954 | 12/1991 | Van Tyne et al. | 382/168 |
| 5,086,480 | 2/1992 | Sexton | 382/171 |
| 5,091,975 | 2/1992 | Berger et al. | 382/123 |
| 5,103,490 | 4/1992 | McMillin | 382/318 |
| 5,120,940 | 6/1992 | Willsie | 235/462 |
| 5,134,669 | 7/1992 | Keogh et al. | 382/318 |
| 5,199,081 | 3/1993 | Saito et al. | 382/116 |
| 5,239,625 | 8/1993 | Bogart et al. | 395/128 |
| 5,241,166 | 8/1993 | Chandler | 235/494 |
| 5,257,327 | 10/1993 | Hirosawa | 382/235 |
| 5,267,333 | 11/1993 | Aono et al. | 382/166 |
| 5,285,506 | 2/1994 | Crooks et al. | 382/189 |
| 5,296,690 | 3/1994 | Chandler et al. | 235/462 |
| 5,331,137 | 7/1994 | Swartz | 235/375 |
| 5,365,048 | 11/1994 | Komiya et al. | 235/463 |
| 5,426,513 | 6/1995 | Scorse | 358/453 |
| 5,486,686 | 1/1996 | Zdybel, Jr. et al. | 235/375 |

FOREIGN PATENT DOCUMENTS

| | | |
|---|---|---|
| 58-70389 | 4/1983 | Japan . |
| 63-94384 | 4/1988 | Japan . |
| 1-316887 | 12/1989 | Japan . |

*Primary Examiner*—Joseph Mancuso
*Assistant Examiner*—Jayanti K. Patel
*Attorney, Agent, or Firm*—Jones & Askew

[57] ABSTRACT

A method and apparatus for compressing documentary data, in which document data is first checked for the presence of decodable symbols such as bar code, Postnet code, or Maxicode (bullseye-type) code. If such symbols are detected, they are decoded, their boundaries defined, and identities recorded. Efficient compression is then performed on the decoded data, the symbol locations and the symbol identities, and higher fidelity compression techniques are performed on undecodable symbols such as signatures. Reconstruction of the image is performed by decompression of all data and superimposition of the decoded images over the undecodable images.

9 Claims, 4 Drawing Sheets

DETECTION OF A KNOWN SYMBOL

| ALGORITHM | BIT OF IMAGE | FIDELITY | SIZE |
|---|---|---|---|
| JPEG (Q=5) | GREY | LOSSY | ~27K |
| RLE (ROW) | BINARY | LOSSLESS | ~10K |
| RLE COLUMN | BINARY | LOSSLESS | ~9K |
| SYMBOL RECONSTRUC | BINARY | LOSSY | <3K |

METHOD AND APPARATUS FOR COMPRESSING IMAGES CONTAINING OPTICAL SYMBOLS

CROSS REFERENCE TO RELATED APPLICATIONS

Reference is made to commonly-assigned, pending U.S. patent application Ser. No. 07/927,909, entitled "Method and Apparatus for Detecting Artifact Corners in Two-Dimensional Images", filed Aug. 10, 1992, in the name of Joe Zheng and Mihael Klancnik, U.S. patent application Ser. No. 08/024,386, entitled "Method and Apparatus for Locating a Two-dimensional Symbol Using a Double-template", filed Feb. 27, 1993, in the name of Joe Zheng and Jainsu Lai., and U.S. patent application Ser. No. 08/237,550, entitled "Postnet Bar Code Decoder", filed May 2, 1994, in the name of Joe Zheng and Wenhua Li.

TECHNICAL FIELD

This invention relates in general to data compression and decompression, and particularly relates to the compression and decompression of images which may include decodable individual images (e.g. bar code or Postnet code) randomly situated within the overall image, or may also include individual images which are not decodable but for which a high degree of fidelity is required (e.g. a foreign code or signature).

BACKGROUND OF THE INVENTION

For many industries, transportation is the single biggest cost associated with logistics. Before inventories can be scheduled or replenished, a company must know exactly what is being shipped, when it is going to arrive, and how many kinds of items to expect.

This can be accomplished by tracking personnel whose sole purpose is to execute documentation and contact available carriers to determine shipment status. However, information obtained in this way is often nothing more than a rough estimate. To speed up the exchange of business information related to freight shipments, many carriers are turning to electronic data interchange (EDI) to better track where a shipment is, when it will arrive and what it contains. By utilizing optical symbologies and standard EDI transaction sets, a carrier can track goods within the transportation path more accurately than before.

Optical symbologies are being developed rapidly. The superior characteristics of optical symbologies makes it possible to have automatic data entry. One-dimensional bar codes are ubiquitous while two-dimensional high density codes are quickly emerging. Both techniques provide, perhaps, the best mechanism in a tracking system set. To electronically transmit business information, the increasing demands from users are no longer limited to data itself. Often, specific forms along with the symbols must be transmitted. The current technology is the use of fax machines or computer modems. The technique employed is to compress image data of the form to be transmitted and uncompress the data at the destination. The problem that often occurs at the destination is that the symbols in the forms are no longer decodable due to the processing methods in use. A need has therefore been recognized for an improved method to compress a document file containing such optical symbols as much as possible for the fast transmission and efficient storage and meanwhile to guarantee the readability of the document and the symbols thereon when data are uncompressed.

The prior art discloses many approaches to data storage, compression, and transfer. For example, U.S. Pat. No. 5,134,669 discusses using an address, bar code an signature on a form See FIGS. 3, and 4). Variable data is separated from background printing by extracting information from desired areas. Compression of the document is utilized as discussed in Column 9, lines 14–35, Column 10, lines 29–46.

U.S. Pat. No. 4,020,462 discloses removal of form background information from an image for data compression. U.S. Pat. No. 4,481,665 shows a character segmentation method for reading postal codes and addresses. U.S. Pat. No. 5,091,975 discusses compression of a signature signal. U.S. Pat. No. 5,239,625 shows merging images rasterized at different resolutions.

U.S. Pat. No. 5,040,233 discloses discarding data in a compression scheme. U.S. Pat. No. 5,134,669 to Koegh discloses the use of compression and overlayment techniques relating to executed form documents such as standardized tests, census information or surveys. This patent discloses the recognition and decoding of decodable symbols such as Postnet or bar codes placed on such forms, with the symbols being read, compressed, and subsequently overlaid upon the form indicia if needed.

Although the above-referenced prior art includes some advantages, disadvantages still exist, and the industry always welcomes new means for efficiently storing and transferring significant amounts of data.

SUMMARY OF THE INVENTION

The present invention overcomes deficiencies in the prior art by providing an improved method and apparatus for compressing images containing optical symbols, which is efficient while still allowing for effective and accurate data transfer.

Generally described, the present invention relates to a method for image data compression of an image including a decodable symbol therein, comprising the steps of storing a digital signal corresponding to an image as image data, recognizing the presence of the decodable symbol as a symbol portion of the image data, decoding the symbol portion of the image data portion to determine the content and location of the symbol, storing the symbol content and location data, replacing the symbol portion of the image data with a more easily compressible homogeneous image data portion, and compressing the image data and the symbol and location data.

Further described, the present invention relates to a method for image data compression of an image including a decodable symbol therein, comprising the steps of storing a digital signal corresponding to an image as image data, recognizing the presence of the decodable symbol as a symbol portion of the image data, decoding the symbol portion of the image data portion to determine the content and location of the symbol, storing the symbol content and location data, replacing the symbol portion of the image data with a more easily compressible homogeneous image data portion, identifying an nondecodable symbol for particular high frequency compression, and compressing the image data, the symbol and location data, and the nondecodable symbol, with the nondecodable symbol being compressed at the high frequency compression rate.

Therefore, it is an object of the present invention to provide an improved method and apparatus for facilitating document compression.

It is a further object of the present invention to provide a method and apparatus for compressing images in an efficient fashion while guaranteeing a high degree of readability of the document and the decodability of symbols thereon.

It is a further object of the present invention to provide an improved method and apparatus for efficiently storing data.

It is a further object of the present invention to provide an improved method and apparatus for efficiently transferring data.

It is a further object of the present invention to provide an improved method and apparatus for reliably storing data.

It is a further object of the present invention to provide an improved method and apparatus for reliably transferring data.

It is a further object of the present invention to provide a method and apparatus for electronically transferring data obtained from a written or printed document.

Other objects, features, and advantages of the present invention will become apparent upon reading the following detailed description of the preferred embodiment of the invention when taken in conjunction with the drawing and the appended claims.

DETAILED DESCRIPTION OF THE PREFERRED EMBODIMENT

Reference is now made to the drawings, in which like numerals identify like elements throughout the several views.

General Operation

Data corresponding to images on a document is first checked for the presence of decodable symbols such as bar code, Postnet code, or Maxicode (bullseye-type) code. If such symbols are detected, they are decoded, their boundaries defined, and identities recorded. Efficient compression is then performed on the decoded data, the symbol locations and the symbol identities, and if desired higher fidelity compression techniques are performed on undecodable symbols such as signatures. Reconstruction of the image is performed by decompression of all data and superimposition of the decoded images over their positions originally defined in the images.

The Overall System

Figure 1:
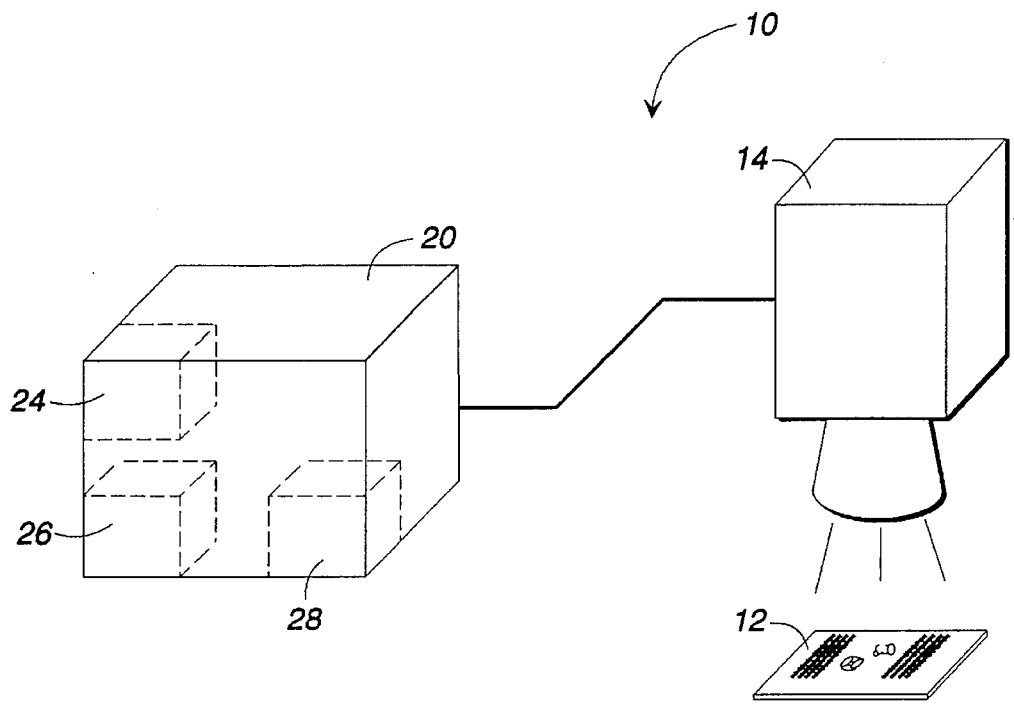
FIG. 1 is an illustration of the general system configuration.

Referring now to FIG. 1, there is depicted an apparatus 10 and method for using same, which is typically used to optically sense a document 12. The apparatus includes a central computer 20 and a sensing mechanism 14. The sensing mechanism 14 includes a charge-coupled device (CCD) based imaging capturing device, on preference being a line scanner.

The output signal from the sensors of the sensing mechanism is read out to a computer 20 including an analog-to-digital (A/D) converter portion 24 controlled by a micro processor portion 26. The A/D converter converts the received signal to a digital signal and sends the signal to a computer memory portion 28. The signal stored in the computer memory is referenced as image data. To access information relating to any pixel in the computer memory 28, two parameters, x representing column and y representing row, that is, coordinates (x,y) are used as an address to a pixel. Therefore, the digitized video signal can be viewed as a two dimensional image in the computer memory, and as such they can "scanned" and "read" as understood and referenced to in the industry.

The Document

Figure 2:
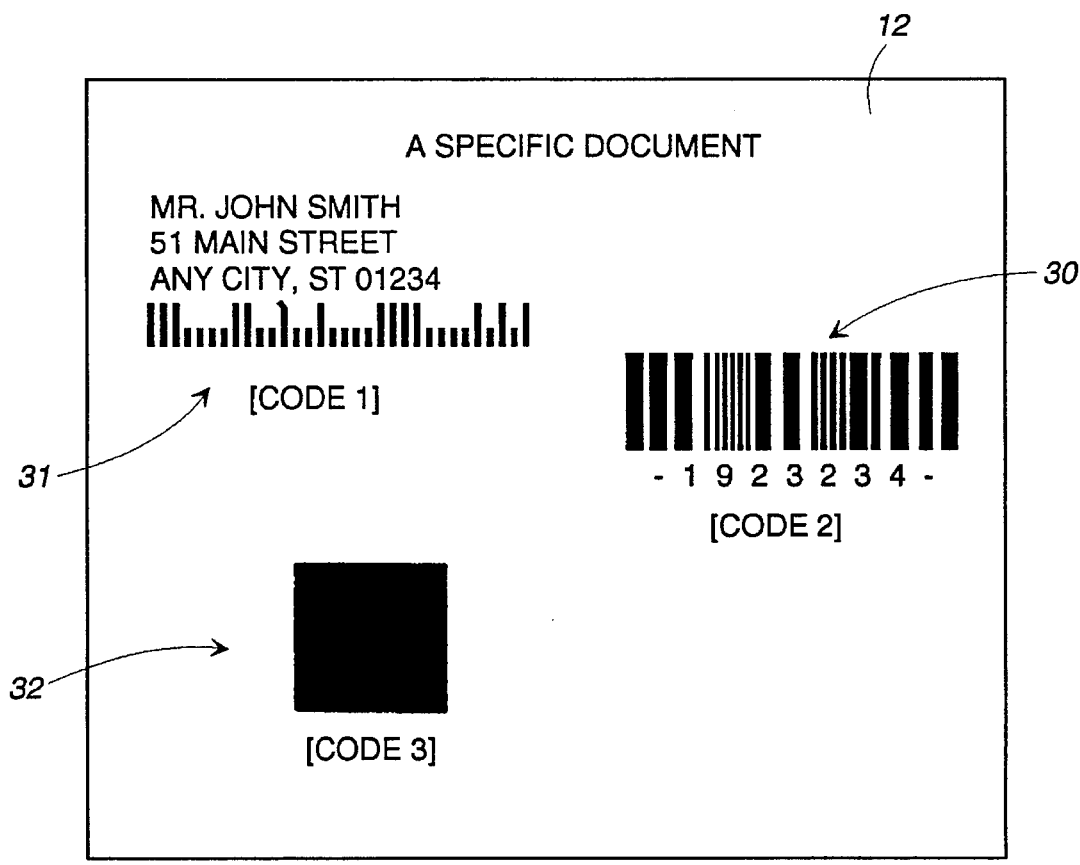
FIG. 2 shows a sample of printed document with three different symbols wherein two are known symbols and one is a foreign symbol.

FIG. 2 shows a sample of a printed document 12 with 3 different symbols. Code 1, referenced as 31, is a Postnet bar code which is commonly seen under a delivery address as it facilitates U.S. Postal Service to automatically sort and route mail pieces. Code 2, referenced as 32, is a representation of one-dimensional conventional bar code which may carry a tracking number or a parts serial number or the like. Code 3, referenced as 33, shown as a "blob", is a general representation of a two-dimensional symbol which may carry customer-specified information or alternatively a representation of a foreign code or undecodable symbol or signature present in the document.

Figure 3:
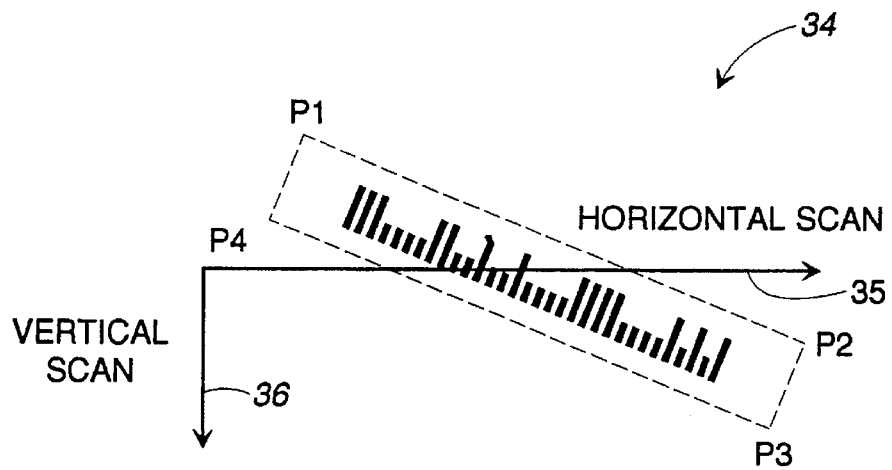
FIG. 3 demonstrates a Postnet code which can be scanned from top to bottom (horizontal scan) and left to right (vertical scan). In this orientation, the Postnet code is at an angle $\phi$ relative to the horizontal scan direction, or scan axis. The code is spacially defined by points p1, p2, p3, and p4.

It should be understood that Codes 1 and 2 are codes that, for purposes of this application can be identified, have their boundaries defined, and decoded. For example, the Postnet code shown in FIG. 3 can for purposes of this application be decoded, and its location in relation to the overall document can be determined. Location is defined as knowing the angle $\phi$ shown in FIG. 3 (angle between the code axis and horizontal scan direction), as well as the outer boundaries of the code, defined as a rectangle having points p1, p2, p3, and p4 at its corners.

It should also be understood that other recognizable codes can be used in connection with the present invention without departing from the present invention. Similarly, variations on Code 3 will not necessarily depart from the spirit and scope of the present invention.

Scanning; Code Recognition

Figure 5:
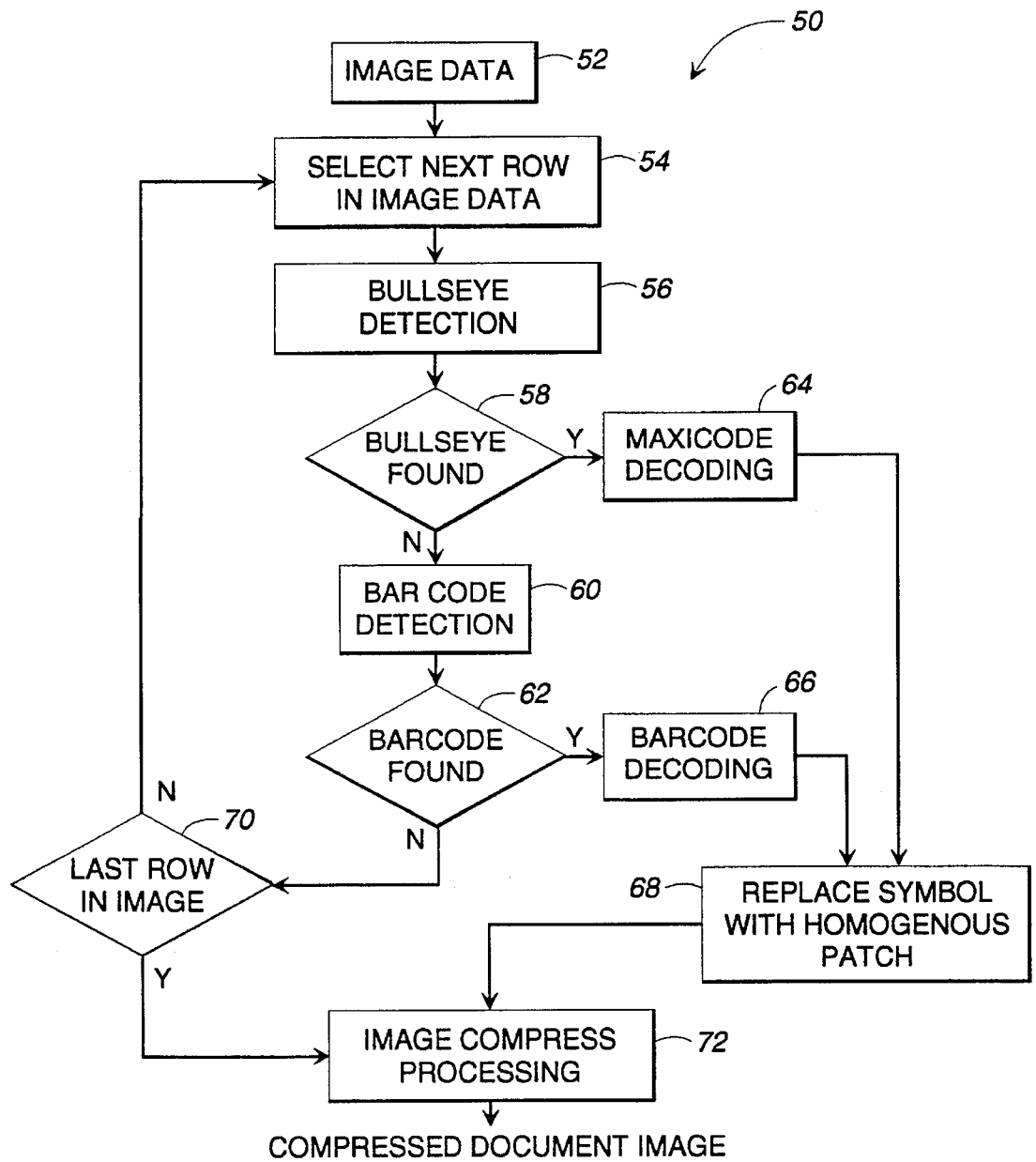
FIG. 5 is a flow chart illustrating a system flow chart.

Reference is now also made to FIG. 5, a system flow chart 50 is shown. Image data such as referenced above at 52 is "scanned" line by line, either horizontally or vertically. The purpose of this scanning process is to locate any decodable symbols, such as bar codes, Postnet codes, or Maxicodes, which are present in the image. One current embodiment only for example is implemented to locate and decode two codes: MaxiCode and bar-codes. In the scanning process, a bullseye detection means at 56 for locating the concentric rings embedded in the MaxiCode is utilized. If the locating effort fails at 58, a barcode detection means at 60 for locating the start/end zone in a barcode is followed. The image size is examined at 70 before the same procedure is applied to the next scanning line if the barcode detection means fails at 62.

It should be understood that the present invention contemplates the use of many different code recognition and decoding methods, including some prior art methods for recognizing the existence and type of a particular code, and for compressing the date included in the code.

For example, U.S. Pat. Nos. 5,276,315, 5,329,105, 5,343,028, 5,352,878, and 5,412,196, all incorporated by reference, disclose methods for recognizing and processing bar code symbols which may be used. As previously discussed, pending application Ser. No. 08/237,550, entitled "Postnet Bar Code Decoder", filed May 2, 1994, also incorporated by reference, discloses a usable recognition and decoding scheme.

Regarding bullseye-type code detection and decoding, methods such as disclosed in U.S. Pat. Nos. 4,874,936 and 4,896,029, incorporated by reference, may also be utilized under the present invention.

Decoding

When one of the detection means is successful at either 58 or 62, the respective decoding process (64 and 66) is called to decode the detected symbol. In the decoding process, the size and location of the decodable symbol is determined.

Code Replacement

Figure 4:
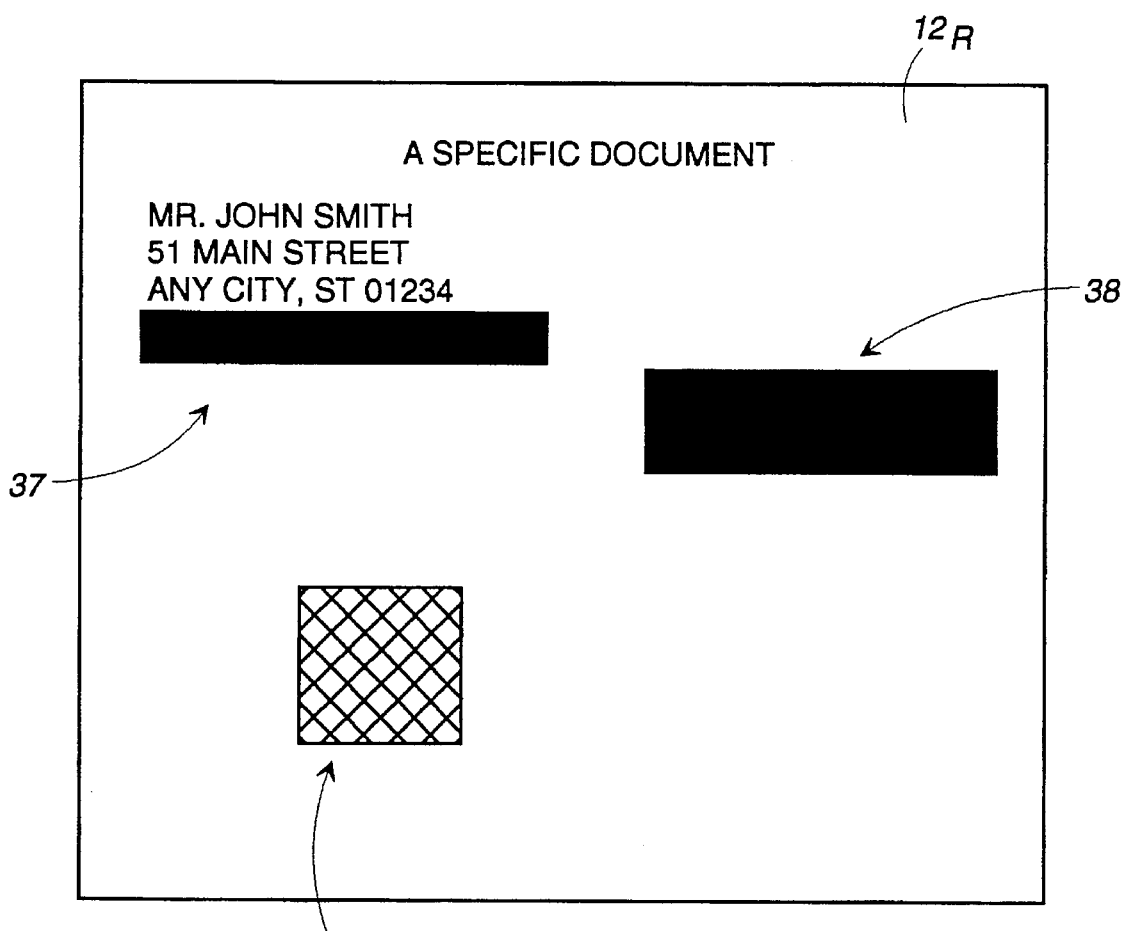
FIG. 4 is a document representation illustrating that data corresponding to an area containing a decodable symbol can be replaced by a homogeneous area and undecodable symbols can be "flagged" (see the checkered area) for high fidelity or lossless compression.

As stated above, after the decoding process, the content, size and location of the decodable symbol is known before compression has occurred. Prior to compressing the data corresponding to the document image, the document image is "rectified" as shown in FIG. 4. The rectified image as shown in FIG. 4 has all decodable symbols removed and filled with homogeneous areas or "patches" at 37 and 38, in place of Codes 1 and 2. It should be understood that these homogeneous patches are more easily compressed than the "image" versions of the codes.

The above-reference step of first decoding the symbols and essentially removing the occupied area may be understood to preserve important information embedded in the decodable symbology while also reducing high frequency energy by replacing the symbology with a rectangular homogenous area. This makes is possible to compress a printed document or similar data format to a minimum compact form for efficient electronic data interchange or storage.

Undecodable or Foreign Codes

If a symbol is recognized to require special care, such as in the case of a signature, or a foreign (unreadable) symbol, it may be desired to treat the unreadable symbol with special care by either compressing it in a lossless or low loss fashion. In cases where noise in images becomes substantial, noise filtering may be used to remove the noise. In searching for the symbols including both readable and unreadable symbols, a process is used to determine signal cross-correlation coefficient. Noise, dirt or other contaminants present in images are general random, thus the cross-correlation coefficient between lines or columns of the images tend to be low. Signatures, sign, or other undecodable symbols possess high cross-correlation may be used to differentiate between noise and unreadable symbols.

In the case of undecodable symbology, a correction signal is generated. The correction signal is used as a reference to signal a need of special care of the area containing the undecodable symbol. The process of the special care of the area is either to disregard the coordinates as normal texture or defining the area so as to be compressed in lossless fashion or compressed with high fidelity.

Compression

After the data corresponding to the document image is processed as discussed above, the data is now ready for compression. A means for compressing image data is then employed as discussed in detail below. It should be understood that any decoded symbol messages along with the symbol position is also compressed along with the rectified image referenced in FIG. 4.

Figures 7, 8:
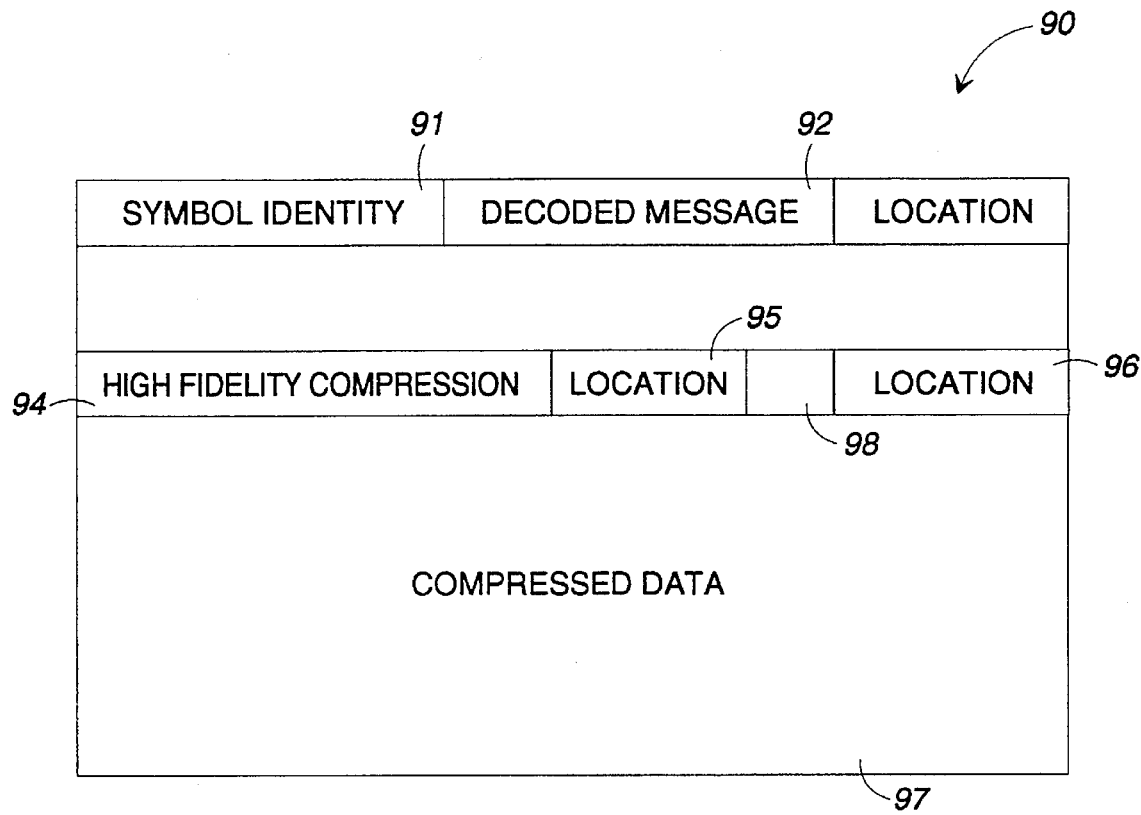
FIG. 7 shows a date structure of a compressed image wherein the head file comprising decoded information, symbol identity, high fidelity, and other parameters.
FIG. 8 is a comparative chart.

Reference is now made to FIG. 7, which is a sample data structure 90 of the compressed image format. A header file is employed to carry information regarding decoded symbol identity at 91, the decoded message at 92 and its corresponding location at 93. For undecodable symbols or other images requiring special care, a high fidelity compression flag is located at 94, with the location of the special image stored at 95. Similarly, a second undecodable symbol is located at 98 after being compressed with a high fidelity compression and the corresponding location is stored at 96. A certain block in the data structure is allocated to contain all the information regarding the undecodable symbols. The compressed data resulting from compression of the rectified image is denoted at 97.

Decompression

Figure 6:
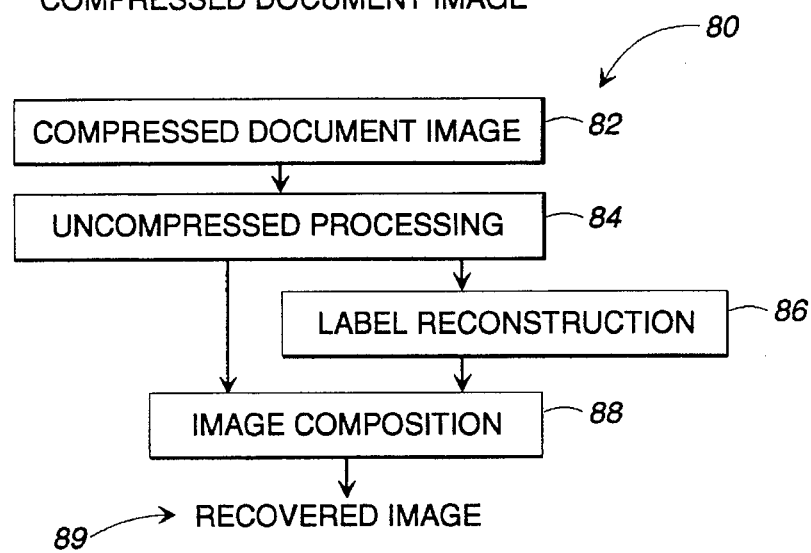
FIG. 6 is a flow chart of uncompressing the compressed document image.

Referring now to FIG. 6, there is depicted a flowchart of uncompressing the compressed document image. The compressed document image is kept in a computer memory for easy accessing at 82. The uncompressing processing at 84 comprises a reversal processing means for uncompressing the compressed document image. There are two outputs from 86, one being the recovered image and the other one being the decoded symbol messages along with the symbol position which is sent to symbol reconstruction at 86. Based on the message and the position, a respective symbol is reconstructed. Symbol composition at 88 replaces the homogeneous patches with the reconstructed symbol and outputs a recovered document image.

Therefore, it may be seen that when an image is to be uncompressed, the header file is read to determine if any symbols need reconstructed into the proper location based on the symbol identity. Further, the header file is checked for high fidelity compression area. A recovered image is thus a superimposed image of locally reconstructed images over an uncompressed whole image.

Data Compression Schemes

Regarding the data compression, many different compression techniques may be used under the present invention, such as those shown and described in "Digital Image Compression Techniques", by Majici Rabbani and Paul Jones, authors, published in 1991 by SPIE Optical Engineering Press, Volume TT7, library code TA 1632.R23.

JPEG (Joint Photographic Experts Group) is one proposed standard compression algorithm which may be used. It compresses image data by removing high frequency energy. RLE (Run Length Encoding) is a standard line coding scheme wherein the scheme is dependent on the contents in an image. Reference is now made to FIG. 8. The method is called Symbol Reconstruction using RLE for a processed image. The table shown in FIG. 8 shows a result of a 640×480 8 bit image. The computer memory to store this image needs to be 300K bytes (680×400×8=2457600 bits= 307200 bytes). The image contains a regular barcode. Using JPEG algorithm to compress the image results in a size of 27K. This gives an approximately 11 to 1 compression ratio. The primary purpose of keeping this image is to make the compressed image retraceable for future use. Thus, it is required to have the barcode readable when the image is uncompressed. A simple RLE along rows or columns can further reduce the image size, yet the experiments carried out in the embodiment demonstrate that the bar codes become difficult to read due to the binalization process in the RLE algorithms. Using the symbol reconstruction scheme shows that the image data is much further reduced to over 90 to 1 ratio while the barcode is decodable without any error in the uncompressed image.

Particular Code Recognition Schemes; Other Applications

As discussed above, although my current embodiment detects the above-referenced symbols before an actual compression process starts, it is feasible to attach more location schemes in the figure to detect other possible symbols or even other criterion to localize any suspicious area which show the busyness of image signal.

Preferred Hardware

In the current embodiment, a Pulnix 7-CN video camera manufactured by Pulnix America, Inc. of Sunnyvale, Calif. 94086 is used to "grab" the document images. Such an imaging capturing device includes a plurality of photo sensors which receive an amount of light reflected from the document 12.

Conclusion

While this invention has been described in specific detail with reference to the disclosed embodiments, it will be understood that many variations and modifications may be effected within the spirit and scope of the invention as described in the appended claims.

What is claimed is:

1. A method for image data compression of an image including a decodable symbol therein, comprising the steps of:
    a) storing a digital signal corresponding to an image as image data;
    b) recognizing the presence of said decodable symbol as a symbol portion of said image data, said symbol portion being a space having an outer peripheral boundary;
    c) decoding said symbol portion of said image data portion to determine the content and location of said symbol;
    d) storing said symbol content and location data;
    e) replacing said symbol portion of said image data by filling said symbol portion space within said outer peripheral boundary with a more easily compressible homogeneous image data portion; and
    f) compressing said image data as modified in step "e" and also compressing said symbol and location data.

2. The method as claimed in claim 1 for image data compression of an image including a decodable symbol therein, further comprising the steps of:
    g) decompressing said modified image data and said symbol and location data; and
    h) replacing said homogeneous image data portion with said symbol portion previously replaced by said homogeneous data portion in step "e".

3. The method as claimed in claim 2 for image data compression of an image including a decodable symbol therein, wherein said decodable symbol is a Postnet code.

4. The method as claimed in claim 3 for image data compression of an image including a decodable symbol therein, further comprising the steps of:
    g) decompressing said modified image data and said symbol and location data; and
    h) replacing said homogeneous image data portion with said symbol portion previously replaced by said homogeneous data portion in step "e".

5. The method as claimed in claim 2 for image data compression of an image including a decodable symbol therein, wherein said decodable symbol is a bar code.

6. The method as claimed in claim 5 for image data compression of an image including a decodable symbol therein, further comprising the steps of:
    g) decompressing said modified image data and said symbol and location data; and
    h) replacing said homogeneous image data portion with said symbol portion previously replaced by said homogeneous data portion in step "e".

7. The method as claimed in claim 2 for image data compression of an image including a decodable symbol therein, wherein said decodable symbol is a bullseye-type code.

8. The method as claimed in claim 7 for image data compression of an image including a decodable symbol therein, further comprising the steps of:
    g) decompressing said modified image data and said symbol and location data; and
    h) replacing said homogeneous image data portion with said symbol portion previously replaced by said homogeneous data portion in step "e".

9. A method for image data compression of an image including a decodable symbol and a nondecodable symbol therein, comprising the steps of:
    a) storing a digital signal corresponding to an image as image data;
    b) recognizing the presence of said decodable symbol as a symbol portion of said image data said symbol portion being a space having an outer peripheral boundary;
    c) decoding said symbol portion of said image data portion to determine the content and location of said symbol;
    d) storing said symbol content and location data;
    e) replacing said symbol portion of said image data by filling said symbol portion space within said outer peripheral boundary with a more easily compressible homogeneous image data portion;
    f) identifying said nondecodable symbol for particular high frequency compression; and
    g) compressing said image data as modified in step "e", and also compressing said symbol and location data, and said nondecodable symbol, with said nondecodable symbol being compressed at said high frequency compression rate.

* * * * *